United States Patent Office 2,775,529
Patented Dec. 25, 1956

2,775,529

MANUFACTURE AND USE OF CELLULOSE ESTERS

Harold Bates, Charles William Sammons, and James Wotherspoon Fisher, Spondon, near Derby, England, assignors to British Celanese Limited, a corporation of Great Britain No Drawing. Application March 13, 1952,
Serial No. 276,441

Claims priority, application Great Britain March 28, 1951

6 Claims. (Cl. 106—165)

This invention relates to the manufacture and use of cellulose acetate and other aliphatic acid esters of cellulose.

As is well known, the type of cellulose acetate which is commonly used in the manufacture of one- and two-dimensional shaped articles, such as filaments and films, contains a proportion of unacetylated hydroxyl groups, and thus has an acetyl content considerably below that of fully acetylated cellulose, i. e. cellulose triacetate. For example it may have an acetyl content (calculated as acetic acid) between about 52% and 57%, whereas cellulose triacetate has in theory an acetyl content of 62.5%. (In practice the term "cellulose triacetate" is employed to denote also cellulose acetates having acetyl contents near to this figure, namely from about 60% upwards, and it will be employed in this sense in the present specification; similarly the terms "cellulose tripropionate," "cellulose tributyrate" and "cellulose triester" will be used to denote cellulose esters having the same free hydroxyl content as cellulose acetates of acetyl contents between about 60 and 62.5%, namely about 0.2 or fewer hydroxyl groups for each anhydro-glucose unit of the cellulose.)

The immediate product of industrial acetylation processes is a cellulose triacetate, often referred to as a primary acetate, and this is converted into an acetate of lower acetyl content, characterised by being soluble in acetone, by a process of hydrolysis known as "ripening." The cellulose acetate obtained by the ripening process is termed a secondary acetate, and is the type normally employed for the production of filaments.

The usual methods of obtaining a solution of a secondary cellulose acetate suitable for use in the manufacture of filaments (hereinafter termed a spinning solution) consists of a considerable number of operations. These include the actual acetylation of the cellulose, whereby a solution of the primary cellulose acetate is obtained; the ripening of the primary acetate in this solution, and the precipitation of the ripened or secondary acetate from the solution; the purification of the precipitated acetate by washing followed by drying; and the re-solution of the acetate in acetone, to form the spinning solution. Further when, as is the ordinary practice, sulphuric acid is used as a catalyst for the acetylation, the ripened cellulose acetate contains a proportion of combined sulphuric acid which, though small, is sufficient to render it unstable; an additional operation known as stabilising is therefore usually necessary, and is applied to the precipitated acetate after it has been washed; stabilisation in its turn is followed by another wash before the cellulose is dried.

Processes of the type described, in which the cellulose acetate goes into solution as it is formed, are known as processes of the solution type. Another type of process exists (known as the suspension type), in which the cellulose acetate does not dissolve but retains the general fibrous form of the cellulose from which it is made. Such processes have the advantage that perchloric acid may be used as catalyst in the acetylation to the complete exclusion of sulphuric acid, so that the need for a separate stabilising operation is eliminated. However, the ripening of the fibrous primary acetate has been found to present great difficulties, particularly in obtaining a uniformly ripened product. Moreover perchloric acid is not an effective ripening catalyst, and if sulphuric acid is employed as a ripening catalyst, the stability of the cellulose acetate is impaired. Partly at least for these reasons, processes of the suspension type have not been employed commercially for the production of cellulose acetates for spinning.

In its simplest aspect the present invention is a new method of ripening cellulose triesters of aliphatic acids containing 2–4 carbon atoms in the molecule, especially cellulose triacetate, which have been made by a process of the suspension type. According to the invention we form a solution of the cellulose triester in a mixture of a lower aliphatic acid and a minor proportion of water or of an alcohol, especially a lower aliphatic alcohol, which is substantially free from inorganic acids, and ripen the ester in the solution at a temperature above 100° C. This new method of ripening cellulose triesters made by a process of the suspension type has three great advantages: Firstly a very uniform product can be obtained, secondly the process is operated in the absence of sulphuric acid, and thirdly the ripened cellulose esters are obtained in the form of solutions which we have found can be employed directly as spinning solutions, as will be described below in more detail. The invention therefore includes not only the actual new method of ripening, but also the manufacture of one- and two-dimensional shaped articles such as filaments and films by shaping and setting solutions obtained from fibrous cellulose triesters by the new ripening process.

The cellulose triesters are as a rule insoluble at ordinary temperatures in the mixtures of lower aliphatic acids and water or an alcohol which are employed in the process of the invention, but dissolve as the temperature is raised to the level to be used for the ripening. If desired the solution and the ripening may be carried out as two distinct operations, e. g. in separate vessels, but it is usually simpler to heat the ester and the acid, preferably with agitation, in the vessel to be used for the ripening, and to allow the ester to dissolve as the temperature rises.

The invention is especially valuable in connection with the ripening and use of cellulose triacetate, and will be described with reference thereto. It may however also be used in connection with the ripening and use of other cellulose triesters of aliphatic acids containing 2–4 carbon atoms, such as cellulose tripropionate, cellulose tributyrate, and mixed esters such as primary cellulose acetate propionates and acetate butyrates.

The cellulose triacetate is preferably dissolved in hot aqueous acetic acid containing between about 2% and 15% by weight of water, and is ripened by holding the solution at a temperature above 110° C., but of course below the temperature at which the cellulose triacetate begins to decompose otherwise than by hydrolysis, until the cellulose acetate has the desired acetyl content. For most purposes it will be satisfactory to stop the hydrolysis, e. g. by cooling the solution, when a sample of the cellulose acetate, after being separated from the aqueous acetic acid, can be dissolved in acetone to give a clear solution.

The concentration of the cellulose triacetate in the aqueous acetic acid solution may be about 15%–30%, and especially 17%–26%, but higher or lower concentrations can be used. Preferably the aqueous acetic acid contains above 3%, and especially 4%–12%, by weight of water, and the solution of the cellulose triacetate therein is heated to a temperature between 115° or 120° C. and 140° or 145° C., temperatures of about 130°–135° C. being very suitable. At temperatures of about 130°–135° C. ripening to acetone-solubility is usually complete within about 1.5–4 hours, depending on the precise water content of the aqueous acetic acid. For example, if the aqueous acetic acid contains 10% of water, a completely acetone-soluble cellulose acetate will usually be obtained in about 2 hours; if the proportion of water is reduced to 5%, ripening is somewhat slower and may need about 3 hours to produce a product capable of giving a clear solution in acetone. The time of ripening may if desired be considerably shortened by working at higher temperatures, e. g. temperatures up to about 190°–200° C., using an apparatus capable of withstanding the developed pressure; such conditions may be used for example when the ripening is to be effected as a continuous process.

In carrying out the new ripening process, the solid cellulose triacetate may be added to previously heated aqueous acetic acid, or it may be added to the acid in the cold and the mixture heated until the cellulose triacetate has dissolved, or part or all of the water may be added only after the acetic acid and cellulose triacetate have been heated. For example fibrous cellulose triacetate may be ground to a powder, which may be added to the aqueous acetic acid in the cold; the mixture is stirred to form a paste of uniform consistency, and then heated until the cellulose triacetate dissolves. Further heat is applied to the solution as may be necessary to bring the solution to the desired ripening temperature, and to maintain the temperature during the ripening period. The aqueous acetic acid and the cellulose triacetate may for example be contained in an open vessel which is placed in a larger vessel capable of withstanding pressure, into which steam at a suitably high temperature is fed; or the cellulose triacetate and aqueous acetic acid may be contained in a closed vessel provided with a jacket, internal coils, or other forms of conduit for the passage of steam or some other heating fluid, or with other heating means, for instance an electrical resistance winding. Alternatively or as well, steam may be injected into the liquid; the direct injection of steam may moreover be used to agitate the liquid in addition to heating it, especially while the cellulose acetate is being dissolved. In any method wherein heat is supplied by bringing steam directly into contact with the acetic acid, it is advisable to prevent undue dilution of the acetic acid by the condensation of steam therein, e. g. if necessary by supplying part of the needed heat in other ways.

When the ripening has proceeded to the required degree the cellulose acetate may if desired be precipitated by means of water (which may be added as a dilute aqueous acetic acid) or by means of another non-solvent for the cellulose acetate which is miscible with the aqueous acetic acid, for instance an alcohol. The form of the precipitate may sometimes be improved by ensuring that the concentration of cellulose acetate in the solution immediately before the addition of the precipitating agent does not exceed about 15%; if the concentration in the ripening solution is above this value, it may be reduced before precipitation, for instance by the addition of further acetic acid.

However, as has already been said, it is an advantage of the new ripening process, and a valuable aspect of the invention, that the ripened solution may be converted directly into filaments, films, and other one- and two-dimensional shaped articles. In the preferred method of doing this the solution, which for this purpose preferably contains between 20% and 30% and in particular about 23%–26% of the cellulose acetate, is extruded or cast into the desired form and is then set by means of a suitable liquid coagulating agent.

Suitable coagulating liquids include liquid acyclic mono-hydric alcohols having 2 or more carbon atoms in the molecule, acyclic di- and poly-hydric alcohols, and such esters, particularly high boiling esters, mixtures of esters with water, chlorinated hydrocarbons, and mixtures of chlorinated hydrocarbons, as are non-solvents for cellulose acetate but miscible with the acetic acid of the spinning solution. Examples of alcoholic coagulating liquids which are particularly suitable are ethanol, isopropanol, amyl alcohol, ethylene glycol, 1:3-butanediol and glycerol; these are preferably used in an anhydrous or nearly anhydrous state, e. g. with a water content below 3%, and especially about 1% or lower, apart from water derived from the spinning solution. Mixtures of a glycol or glycerol with a monohydric alcohol containing 2–6 carbon atoms in the molecule are very effective. Examples of ester coagulating liquids are aqueous ethylene glycol diacetate and diethylene glycol diacetate, especially aqueous diethylene glycol diacetate of concentration about 30%–35%. Examples of chlorinated hydrocarbon coagulating liquids are mixtures of methylene chloride and carbon tetrachloride, preferably containing at least 50%, e. g. 50%–65%, by weight of carbon tetrachloride. Coagulating liquids of this class should be used under conditions such that the water content of the bath during spinning (derived from the spinning solution) is maintained within the limits of miscibility of water with the other components of the bath.

The spinning solution and coagulating liquid may be at room temperature or at higher temperatures. It is preferable to draw the filaments from the spinning jet under a tension such that before they are set they are stretched to a considerable degree, for e. g. to between 5 and 12 times their unstretched length. The stretch may if desired be imparted in two or more stages. When they are fully set the filaments may be washed free from coagulating liquid, or adherent coagulating liquid may be removed by evaporation, in accordance with the nature of the liquid. Thus water-soluble liquids such as glycols, glycerol and water-soluble esters may be removed by washing with water, after which the filaments may be dried, e. g. in a current of warm air. Volatile liquids such as methylene chloride and carbon tetrachloride, as well as volatile water-soluble liquids such as ethanol and isopropanol, may conveniently be removed by evaporation, e. g. in a current of warm air.

One- and two-dimensional shaped articles may also be formed from the ripened solutions by evaporative or dry-spinning methods, preferably using a heated spinning solution and a heated evaporative medium.

Filaments and yarns obtained by the process of the invention may be given known after-treatments to improve or modify their properties. For example, whether or not they have been stretched during their formation they may subsequently be softened, e. g. by means of wet steam under pressure or dry heat, and stretched, and/or if desired they may be shrunk to some extent or given some other relaxing treatment to increase their extensibility.

It will be seen that the invention provides a simple method of converting fibrous cellulose triacetate obtained by a suspension process into filaments, films, and other one- and two-dimensional shaped articles of cellulose acetate of lower acetyl content, in particular of acetyl content between about 52% and 57%. The new method, quite apart from its simplicity from the operational view point, is characterised by great economy in the use and recovery of solvents. It is a well recognised advantage of the suspension method of acetylation that the acetic acid and diluent are easily recovered in an anhydrous or nearly anhydrous form; the new process offers the further advantages that the same solvent, namely acetic acid, may be employed in the ripening as is present during the acetylation, that no different spinning solvent is required, and that at the end of the spinning operation, if a suitable anhydrous or nearly anhydrous coagulating liquid is employed as described above, the acetic acid can easily be recovered still in admixture with only a small proportion of water.

The invention is illustrated by the following examples.

Example I

Fibrous cellulose triacetate prepared by a suspension method, having an acetyl content of 61.8% and soluble in 90/10 (by volume) methylene chloride/ethanol but insoluble in cold glacial acetic acid, was formed into a paste with 4 times its weight of 90% aqueous acetic acid. The paste was heated to 134° C., and the resulting solution was maintained at this temperature for 2 hours. A sample of the cellulose acetate was then precipitated from the solution by adding dilute acetic acid, and washed neutral; it had an acetyl value of 54.5% and dissolved in acetone to give a solution of good clarity.

Example II

The process of Example I was repeated using a 95% aqueous acetic acid and continuing the heating for 3 hours. The product after precipitation and washing had an acetyl value of 52.6%, and dissolved in acetone to give a solution of good clarity.

Example III

An aqueous acetic acid solution of acetone-soluble cellulose acetate obtained by the process of Example I was filtered and extruded through a spinning jet into a bath comprising a mixture of equal volumes of isopropanol and 1:3-butanediol, both the cellulose acetate spinning solution and the bath being kept at a temperature of 20° C. On leaving the bath the filaments were collected into a yarn, which was passed round a set of three rollers by means of which the filaments were stretched during their passage through the bath to about 10 times their unstretched length. The yarn was then washed with water, dried in warm air, and wound up on a cheese former. It had good lustre, tenacity, and extensibility.

In a modification of this process the bath consisted of a mixture of 45 parts by weight of methylene chloride and 55 parts by weight of carbon tetrachloride, and the water-wash of the yarn was omitted. Again a yarn of good properties was obtained.

Ethanol could be used in place of the water in the processes of Examples 1 and 2.

The ripening process of the invention may be carried out under similar conditions when using lower aliphatic acids other than acetic acid. For example cellulose tripropionate may be ripened in solution in propionic acid, and cellulose tributyrate in butyric acid, under conditions similar to those described in connection with acetic acid. Mixed cellulose esters of acetic acid and another acid are usually most conveniently ripened in acetic acid solution.

The term "lower aliphatic acid" is employed in this specification to denote an aliphatic carboxylic acid containing up to four carbon atoms in the molecule; similarly the term "lower aliphatic alcohol" denotes an aliphatic alcohol containing up to four carbon atoms.

Having described our invention, what we desire to secure by Letters Patent is:

1. A process for the manufacture of one- and two-dimensional shaped articles in which the starting material is a cellulose triester of an aliphatic acid containing 2–4 carbon atoms which has been made from cellulose by a process of the suspension type using a catalyst consisting of perchloric acid and retains the fibrous form of the cellulose, which comprises dissolving the fibrous cellulose triester in a mixture consisting of an aliphatic acid containing up to 4 carbon atoms in the molecule with a minor proportion of a compound of formula $C_nH_{2n+1}OH$, where $n$ is 0–4, which is substantially free from inorganic acids, to form a solution of 20 to 30% concentration of the cellulose ester, maintaining the solution at a temperature above 100° C. until the cellulose ester contains more than 0.2 free hydroxyl groups for each anhydroglucose unit of the cellulose, and spinning and coagulating the solution so obtained.

2. A process for the manufacture of one- and two-dimensional shaped articles in which the starting material is a cellulose triacetate which has been made from cellulose by a process of the suspension type using a catalyst consisting of perchloric acid and retains the fibrous form of the cellulose, which comprises dissolving the fibrous cellulose triacetate in a mixture consisting of acetic acid with a minor proportion of a compound of formula $C_nH_{2n+1}OH$, where $n$ is 0–4, which is substantially free from inorganic acids, to form a solution of 20 to 30% of concentration of the cellulose ester, maintaining the solution at a temperature above 100° C. until the cellulose acetate has an acetyl value of 52–57%, calculated as the free acid, and spinning and coagulating the solution so obtained.

3. Process according to claim 2, wherein the cellulose triacetate is dissolved in a mixture containing at most 97% by weight of acetic acid and at least 3% of the compound of formula $C_nH_{2n+1}OH$, wherein $n$ is 0–4, which is substantially free from inorganic acids, and the solution is maintained at a temperature of 120°–140° C.

4. Process according to claim 2, wherein the cellulose triacetate is dissolved in a mixture which contains 88–96% by weight of acetic acid and 12–4% by weight of water, and the solution is maintained at a temperature above 110° C.

5. Process according to claim 1, wherein the shaped solution is set by means of a coagulating liquid.

6. Process according to claim 3, wherein the shaped solution is set by means of a coagulating liquid.

References Cited in the file of this patent

UNITED STATES PATENTS

| Number | Name | Date |
|---|---|---|
| 2,000,601 | Malm et al. | May 7, 1935 |
| 2,028,763 | Dreyfus | Jan. 28, 1936 |
| 2,064,226 | Seymour | Dec. 15, 1936 |
| 2,095,822 | Malm et al. | Oct. 12, 1937 |
| 2,102,016 | Malm et al. | Dec. 14, 1937 |
| 2,106,297 | Dreyfus | Jan. 25, 1938 |
| 2,346,350 | Berl et al. | Apr. 11, 1944 |
| 2,361,500 | Rowley | Oct. 31, 1944 |
| 2,461,572 | Rowley et al. | Feb. 15, 1949 |
| 2,523,384 | Martin et al. | Sept. 26, 1950 |

FOREIGN PATENTS

| Number | Country | Date |
|---|---|---|
| 358,980 | Great Britain | Oct. 16, 1931 |
| 369,215 | Great Britain | Mar. 15 1932 |

OTHER REFERENCES

Heuser: "Cellulose Chem." (1944), page 269.